United States Patent
Frederick, Jr. et al.

(10) Patent No.: US 6,336,168 B1
(45) Date of Patent: Jan. 1, 2002

(54) SYSTEM AND METHOD FOR MERGING MULTIPLE OUTSTANDING LOAD MISS INSTRUCTIONS

(75) Inventors: Marlin Wayne Frederick, Jr., Cedar Park; Bruce Joseph Ronchetti, Austin; David James Shippy, Austin; Larry Edward Thatcher, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,139

(22) Filed: Feb. 26, 1999

(51) Int. Cl.$^7$ ................................................ G06F 13/16
(52) U.S. Cl. ...................... 711/141; 711/146; 711/140; 711/122; 711/217; 712/217; 712/219; 710/39
(58) Field of Search ................. 711/141, 140, 711/146, 214, 122, 217; 712/219, 217, 214, 228; 710/39

(56) References Cited

U.S. PATENT DOCUMENTS 5,826,109 A * 10/1998 Abramson et al. ............ 710/39

* cited by examiner

Primary Examiner—Do Hyun Yoo
Assistant Examiner—Jasmine Song
(74) Attorney, Agent, or Firm—Kelly K. Kordzik; Winstead Sechrest & Minick P.C.; Anthony V. S. England

(57) ABSTRACT

Pipelining and parallel execution of multiple load instructions is performed within a load store unit. When a first load instruction incurs a cache miss and proceeds to retrieve the load data from the system memory hierarchy, a second load instruction addressing the same load data will be merged into the first load instruction so that the data returned from the system memory hierarchy is sent to register files associated with both the first and second load instructions. As a result, the second load instruction does not have to wait until the load data has been written and validated in the data cache.

19 Claims, 4 Drawing Sheets

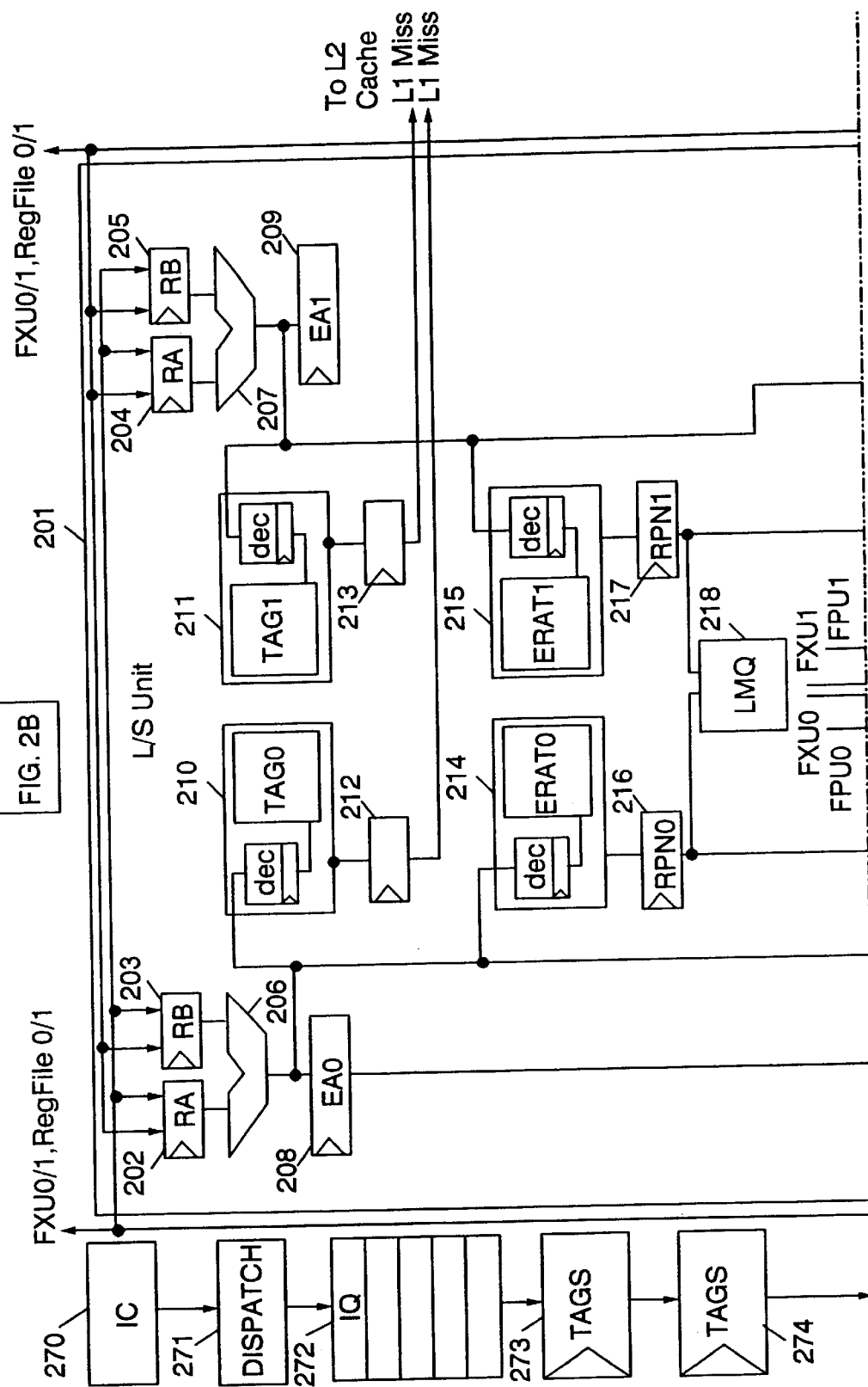

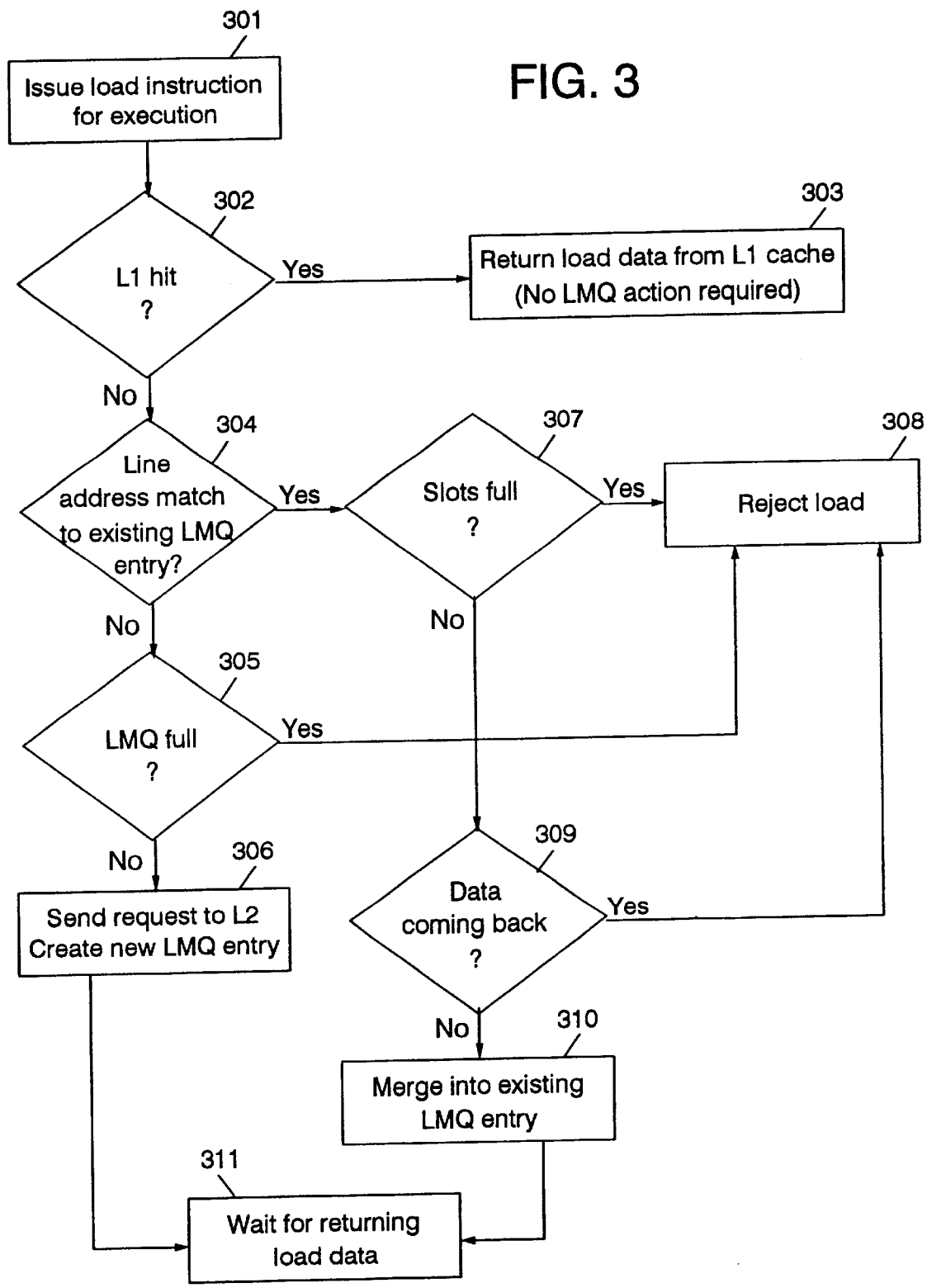

SYSTEM AND METHOD FOR MERGING MULTIPLE OUTSTANDING LOAD MISS INSTRUCTIONS

TECHNICAL FIELD

The present invention relates in general to data processing systems, and in particular, to the execution of load instructions in a processor.

BACKGROUND INFORMATION

In order to increase the operating speed of microprocessors, architectures have been designed and implemented that allow for the execution of multiple parallel load instructions within the microprocessor. Pipelining of instructions permits more than one instruction to be issued for execution substantially in parallel. A problem with such a process occurs when a first load instruction is sent for execution but incurs a cache miss, and then a second load instruction is sent for execution for loading the same cache line as the first load instruction. Typically, in such a situation, the second load instruction would have to be re-executed, or at least wait for the load data from the first load instruction to be retrieved into the primary data cache and validated before the second load instruction could be completed.

As a result, there is a need in the art for an improved process for executing pipelined load instructions within a processor.

SUMMARY OF THE INVENTION

The present invention addresses the foregoing need by merging pairs of load instructions that address the same cache line in certain situations. The present invention provides a load store unit reference that accepts a load instruction to a cache line that is previously missed in the cache. A load miss queue holds the information needed to handle the cache miss of a previous load instruction. When a subsequent load instruction attempts a load from the same cache line that previously missed in the cache, the load miss queue accepts responsibility for the second load instruction. When the cache line is returned to the data cache, the requested data is passed to the register of the first load instruction over a first bus, and the requested data of the second load instruction is passed over a second bus to the register of the second load instruction. Thus, the operands for each of the two load instructions that access the same cache line are both serviced by the same miss operation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B illustrate a load/store unit configured in accordance with the present invention; and FIG. 3 illustrates a flow diagram in accordance with the present invention.

DETAILED DESCRIPTION

Figure 1:
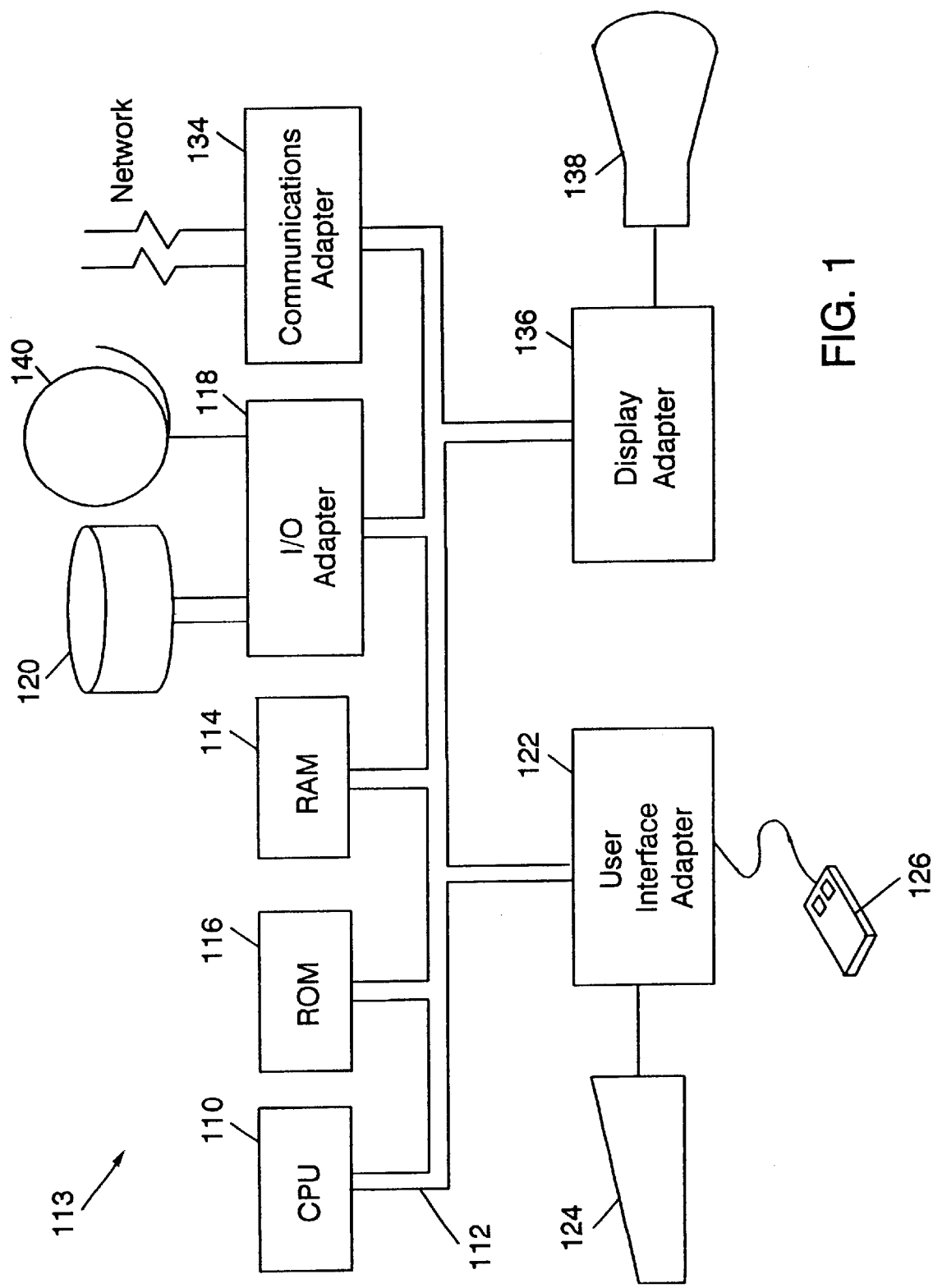
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (CPU) 110, and a number of other units interconnected via system bus 112. CPU 110 embodies the load/store unit 201 of the present invention as described below. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138. CPU 110 may include other circuitry (other than load/store unit 201) not shown herein, which will include circuitry commonly found within a microprocessor, e.g., execution unit, bus interface unit, arithmetic logic unit, etc. CPU 110 may also reside on a single integrated circuit.

Figure 2B:
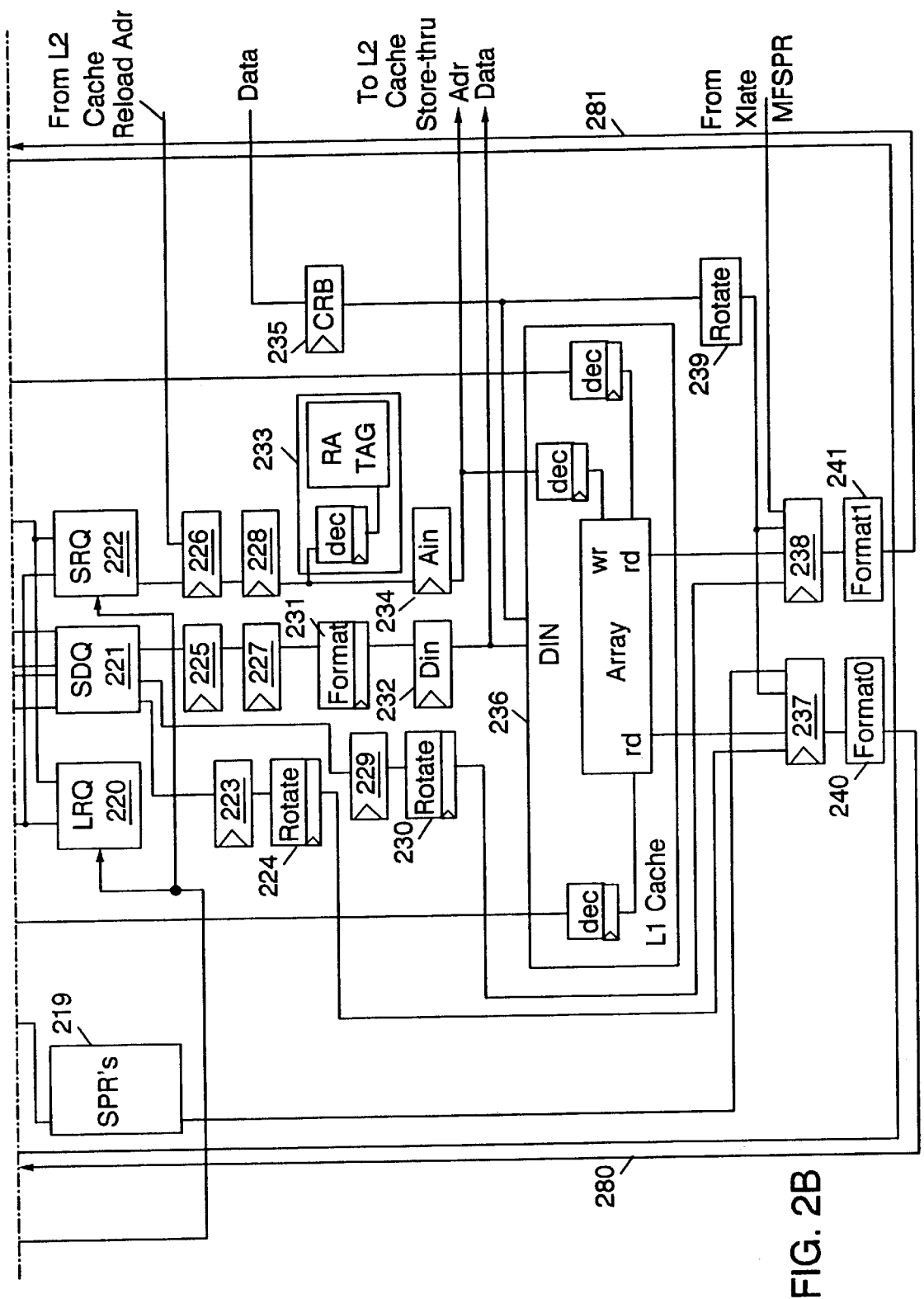

FIG. 2 (FIGS. 2A and 2B) illustrates load/store (L/S) unit 201 configured in accordance with the present invention. L/S unit 201 is located within CPU 110, which may be configured in accordance with typical microprocessor architectures.

L/S unit 201 has two pipelines so that two load or store instructions can be issued per machine cycle. Registers 202–205 receive instructions from fixed point units (FXUs) 0 and 1 (not shown) in a manner well-known in the art. 64-bit adder 206 adds operands received from registers 202 and 203, while 64-bit adder 207 adds operands from registers 204 and 205 to produces a pair of 64-bit effective addresses. These effective addresses are outputted to registers 208 and 209, respectively. Registers 208 and 209 capture the effective addresses (EA). They then both feed LMQ (Load Miss Queue) 218, LRQ (Load Reorder Queue) 220 and SRQ (Store Reorder Queue) 222, which all need a portion of the EA in addition to the real address from registers 216 and 217 to perform address checking. Additionally, the effective addresses are decoded to access tag arrays 210 and 211 to determine if there is a hit or a miss within L1 cache 236. If there is a miss, then the addresses are passed through registers 212 and 213 and sent to the L2 cache (not shown).

Furthermore, the effective addresses are sent from adders 206 and 207 to be decoded and to access the effective real address translator (ERAT) arrays 214 and 215, respectively, which output translated addresses through registers 216 and 217.

Further, the effective addresses from adders 206 and 207 access the L1 cache 236 for the load operation after being decoded by the decoders within the L1 cache 236. If there is a hit in the L1 cache 236, then the data is read out of the L1 cache 236 into registers 237, 238, and formatted by formatters 240, 241, and returned on the result bus to be sent to a register file (RegFile) (not shown). The cache line read out of L1 cache 236 is also returned into the registers 202–205 for operations that are dependent on the result as an operand.

Essentially, the three cycles performed within L/S unit 201 are the execute cycle (where the addition is performed), the access cycle (where access to the arrays is performed), and the result cycle (where the formatting and forwarding of data is performed).

If there is a miss in the cache, the request is then sent down to the L2 cache (not shown). The load miss queue (LMQ) 218 waits for the load data to come back from the L2 cache (not shown). The data associated with that cache line is loaded into the L1 cache 236.

These load operations can be performed speculatively and out of order. Store instructions are also executed out of order. Store instructions are run through the translation operation in translators 214, 215, then inserted into the store data queue (SDQ) 221 for storage into the L1 cache 236 after the instructions have been completed. Therefore, store instructions are executed out of order, but written into the L1 cache 236 in order.

The store reorder queue (SRQ) 222 keeps track of store instructions that have been executed. SRQ 222 maintains the store instructions in the queue and determines when the data is available in the store data queue (SDQ) 221 and when the store instruction is next to complete. The store to the L1 cache 236 is then completed.

Many of the registers 223, 225–229, and 237–238, are utilized for timing.

Cache lines within the L1 cache 236 are accessed based on the effective address of the cache line. The RA tag array 233 keeps track of where in the L1 cache 236 a cache line was written. The format block 231 takes the data from the SDQ 221 and rotates it properly to write into the correct byte positions in the L1 cache 236 upon execution of the store instruction. Rotate blocks 224 and 230 are utilized for store forwarding. Therefore, if there is a store instruction that is sitting in the store queue and has not been written into the queue yet because it is not next to complete, and then a younger load instruction is received that needs that data, the data will be forwarded to the load instruction being executed.

Rotate block 239 is utilized to rotate data received from the L2 cache (not shown) in response to an L1 cache miss, for forwarding the data from the L2 cache on to the result bus for forwarding to the proper register file.

Block 219 contains a number of special purpose registers to store data as a result of special purpose register instructions and read data from these registers so they get into the normal pipeline.

Register 235 is implemented for timing purposes to stage data from the L2 cache (not shown). Format blocks 240 and 241 format (or shift) cache data into the proper byte positions for the load result to the register file.

The load store unit 201 contains a load miss queue (LMQ) 218 as described above, which handles load instructions which miss the L1 data cache 236. The LMQ 218 controls the reloading of the L1 data cache line from downstream memory (secondary or L2 cache, L3 cache, system memory, etc. The LMQ 218 controls forwarding of critical load data onto the result busses 280, 281 to the register files (not shown) when data is returned from the storage hierarchy.

The LMQ 218 has eight entries, which allows for up to eight requests for different cache lines to be outstanding at a time (one cache line miss per entry). Also, each of the eight LMQ entries can provide forwarding of critical data for up to two load instructions (the second load instruction is "merged" into the existing entry, as described below). Therefore, the LMQ 218 may potentially be servicing sixteen load instructions at a time.

The present invention performs a "load-hit-reload merging" function, which merges a load instruction at execution time into an already existing LMQ 218 entry that is waiting for reload data.

When data is returned from the storage hierarchy, the critical load data is forwarded on the result busses 280, 281 to the register file. This critical data forwarding may have the highest priority taking place over another load or store instruction that has just issued. Note that load store unit 201 has two execution pipelines, thus two result busses 280, 281. By merging, the present invention takes advantage of these two pipelines by returning load data on each result bus 280, 281 when the data is returned from the storage hierarchy.

Referring to FIG. 3, a first load instruction is issued by dispatch unit 271 in step 301. In step 302, a determination is made whether the data (cache line) addressed by the first load instruction is resident in the L1 data cache 236. If yes, the process proceeds to step 303 to return the addressed load data from the L1 data cache 236 on the result busses 280, 281.

If the addressed cache line is not resident within the L1 data cache 236, the process will proceed from step 302 to step 304 to determine if the address of the cache line matches with an address within an existing LMQ 218 entry. If not, the process will proceed to step 305 to determine if the LMQ 218 is full. If not, a new LMQ 218 entry is created for the cache miss, and a request for the cache line is sent downstream to the system memory hierarchy, which in this case may be a request to the L2 cache (not shown), in step 306. In step 311, the first load instruction will wait for the return of the load data from the L2 cache. At that time, a second load instruction may be issued by dispatch unit 271 for execution within load store unit 201 (step 301). For purposes of this example, it is assumed that this second load instruction is requesting data in the same cache line addressed by the first load instruction. Therefore, the second load instruction is also addressing the same cache line as the first load instruction. In step 302, it will be determined that the cache line requested by the second load instruction is not within the L1 data cache 236, because this cache line was not available to the first load instruction. Note, this scenario is true in the present invention which executes multiple parallel load instructions by the load store unit 201. If the cache line has already been returned by the L2 cache to the L1 data cache 236 and validated, then an L1 hit will be determined in step 302, and the second load instruction will have the data returned on the result busses 280, 281 in step 303. However, as noted above, it is assumed that the first load instruction is still waiting for a return of the requested cache line (step 311).

In step 304, since the same cache line is being addressed by the first and second load instructions, the process will proceed to step 307 to determine if the slots are full. In other words, it is determined if the LMQ entry created for the first load instruction has already been merged with another third load instruction. If yes, the second-load instruction is rejected in step 308. However, if the slots are not full, the process will proceed to step 309 to determine if the cache line is already in the process of being returned into load store unit 201. If this is true, the second load instruction will be rejected in step 308. The determination in step 309 may be made by observing an L2 cache arbitration signal.

If the data is not yet being returned, the process will proceed to step 310 to merge the second load instruction into the existing LMQ 218 entry corresponding to the first load instruction. The LMQ 218 contains a number of entries. Each entry will have a set of bits for the address of the cache line incurring the load miss. A second set of bits for each entry pertains to control information that determines the format of the data to be returned and stored. Step 304 compares the address of the second load instruction to the address of the first load instruction designated in the LMQ entry.

Each LMQ entry also contains another set of bits for the control information determining the format of the data to be retrieved and stored, but corresponding to a merged load instruction. In step 307, if this second set of bits is already occupied from a previous merge, then the second load instruction is rejected in step 308. However, if not, then the merging operation performed in step 310, results in control information pertaining to the second load instruction being stored in the LMQ entry corresponding to the first load instruction.

Thereafter, in step 311, the second load instruction will also be waiting for the returned load data.

Once the load data is returned, it will be delivered onto both of result busses 280, 281 to the register files corresponding to the first and second load instructions as indicated within the merged LMQ 218 entry.

An advantage of the present invention is that the merging of the second load instruction with the first load instruction allows the load store unit 201 to forward the critical load data onto the result busses 280, 281 when the data is returned from the storage hierarchy. If the second load instruction was not merged with the first load instruction, the second load instruction would have to wait until all of the data (cache line) was written into the L1 data cache 236 and the cache line validated before the second load instruction could then get the data. Merging the second load instruction provides a performance advantage by returning load data as soon as it is made available to the load store unit 201. Returning load data as soon as possible then allows for execution of dependent instructions.

Although the present invention and its advantages have been described in detail, it should be understood that various changes, substitutions and alterations can be made herein without departing from the spirit and scope of the invention as defined by the appended claims.

What is claimed is:

1. A method for executing load instructions in a processor, comprising the steps of:
   issuing a first load instruction for execution;
   determining that data addressed by the first instruction is not in a primary cache;
   retrieving the data from system memory;
   issuing a second load instruction for execution, wherein the second load instruction addresses the data; and
   simultaneously returning the data to first and second register files, wherein the second load instruction does not have to be reissued before receiving the data.

2. The method as recited in claim 1, wherein system memory includes a secondary cache.

3. The method as recited in claim 1, wherein the determining step further comprises the step of:
   allocating an entry in a load miss queue corresponding to the first load instruction.

4. The method as recited in claim 3, wherein the entry in the load miss queue includes an address of the data.

5. The method as recited in claim 4, wherein the returning step further comprises the step of:
   comparing an address of the second load instruction to the address of the data in the load miss queue.

6. The method as recited in claim 5, wherein the returning step further includes the step of:
   merging the second load instruction with the first load instruction.

7. A processor comprising:
   a load/store unit;
   an instruction dispatch unit for issuing a first load instruction to the load/store unit, wherein the first load instruction addresses a cache line;
   circuitry for determining if the addressed cache line is in a data cache coupled to the load/store unit;
   a load miss queue for storing an entry corresponding to the first load instruction when it is determined that the addressed cache line is not in the data cache coupled to the load/store unit;
   circuitry for requesting the addressed cache line from a memory downstream from the data cache;
   circuitry for comparing a cache line address of a second load instruction received for execution in the load/store instruction with the entry in the load miss queue;
   circuitry for merging the second load instruction with the entry in the load miss queue corresponding to the first load instruction;
   a first result bus for transferring the addressed cache line received from the downstream memory to a first register file associated with first load instruction; and
   a second result bus for transferring the addressed cache line received from the downstream memory to a second register file associated with second load instruction circuitry for the addressing cache line simultaneously returning the data to the first and second register files.

8. The processor as recited in claim 7, wherein the second load instruction is serviced at a same time as the first load instruction without having to reissue the second load instruction.

9. The processor as recited in claim 7, wherein the second load instruction receives the addressed cache line without having to wait for the cache line to be stored in the data cache.

10. The processor as recited in claim 9, wherein the second load instruction receives the addressed cache line without having to wait for the cache line to be stored in the data cache and the cache line validated.

11. A system for executing load instructions in a processor, comprising:
    circuitry for issuing a first load instruction to a load/store unit for execution;
    circuitry for determining that a cache line addressed by the first load instruction is not in a primary cache coupled to the load/store unit;
    circuitry for retrieving the cache line from a secondary cache coupled to the processor;

circuitry for issuing a second load instruction to the load/store unit for execution, wherein the second load instruction addresses the cache line; and circuitry for simultaneously returning the cache line to first and second register files, wherein the cache line is received by the second load instruction without the second load instruction having to be reissued.

12. The system as recited in claim 11, wherein the second load instruction receives the cache line without having to wait for the cache line to be stored in the primary cache.

13. The system as recited in claim 11, wherein the second load instruction receives the cache line without having to wait for the cache line to be stored in a data cache and the cache line validated.

14. The system as recited in claim 12, wherein the determining circuitry further comprises:

circuitry for allocating an entry in a load miss queue corresponding to the first load instruction.

15. The system as recited in claim 14, wherein the entry in the load miss queue includes an address of the cache line.

16. The system as recited in claim 15, wherein the returning circuitry further comprises:

circuitry for comparing an address of the second load instruction to the address of the cache line in the load miss queue.

17. The system as recited in claim 16, wherein the returning circuitry further comprises:

circuitry for merging the second load instruction with the entry in the load miss queue corresponding to the first load instruction.

18. The system as recited in claim 17, wherein the returning circuitry further comprises:

a first result bus for transferring the cache line received from the secondary cache to a first register file associated with first load instruction; and a second result bus for transferring the cache line received from the secondary cache to a second register file associated with second load instruction.

19. The system as recited in claim 18, wherein the first and second result busses transfer the cache line to the first and second register files in parallel.

* * * * *